3,336,423
METHOD OF FORMING A CATALYTIC ELECTRODE

Donald E. Le Clair, Westfield, and Jerome C. Dowling, Clark, N.J., assignors to Esso Research and Engineering Company, a corporation of Delaware
No Drawing. Filed Dec. 31, 1964, Ser. No. 422,490
5 Claims. (Cl. 264—86)

This invention is directed to a method of making new and improved pressed catalyst-containing structures. In particular, this invention is directed to a method of producing more efficient electrodes by utilizing uniformly distributed pressure during pressing. More particularly, this invention is directed to a process of making highly efficient electrodes which comprises pressing the electrode between two porous members which have little or no lateral expansion when pressure is exerted thereupon.

Heretofore in the art, the production of electrodes has been plagued with the decided disadvantage that as the wet electrodes are pressed, the escape water tends to tear the electrode structure apart. Various procedures have been attempted to overcome this disadvantage such as using perforated plates to allow the water to escape. However, such a procedure did not provide a uniform pressure across the electrode.

It has now been found that electrodes can be efficiently produced by pressing in a wet state by utilizing the structure to be pressed between two members which are porous and have a small or no lateral coefficient of expansion.

In the practice of this invention, the materials to be pressed into form for use as electrodes can contain an excess amount of water. The material is placed between two members which in practice will generally be in sheet form and then subjected to pressure in order to form the electrode.

The materials which can be made into electrodes according to this invention include all of the known prior art materials such as mixtures of finely divided electrically conductive particles with polymeric particles and in the situation wherein the electrically conductive particles are not catalytic, the foregoing mixture can be impregnated with a suitable catalyst.

The catalysts which can be used in the practice of this invention include all of the well-known catalysts such as the noble metals, the transition metals, mixtures of noble metals, mixtures of transition metals, mixtures of transition and noble metals, alloys of noble metals, alloys of transition base metals, alloys of transition base metals with noble metals, salts and oxides of noble metals, transition base metals, noble metals and transition base metals and salts and oxides of noble metals and transition base metals mixed with finely divided noble and transition base metals. As examples of catalysts which can be used in the practice of this invention, there may be named platinum, platinum-palladium, platinum-rhenium-ruthenium, gold, palladium oxide, nickel oxide, manganese oxide, silver oxide, silver oxide mixed with palladium oxide, iron, iron-cobalt-nickel, and other well-known and accepted catalysts which may be used in the particular function to which the electrode made in accordance with the instant invention is addressed. The particular catalyst to be used or with which the electrode is to be impregnated does not form part of the substance of this invention but the catalyst to be used is discretionary on the part of the operator.

The porous materials which will form the members between which the catalyst will be pressed are sheets of porous polytetrafluoroethylene, polydifluorodichloroethylene, polyhexafluoropropylene, difluorotetrachloropropylene, dichlorotetrafluoropropylene, polypropylene and polyethylene which sheets have a thickness not greater than 0.125 inch. In addition to the foregoing, there may be used in the practice of this invention filter paper with a thin film of porous polyethylene. It is obvious that the materials to be used to press the electrodes must not poison the catalyst contained in the electrodes. In this regard, it is to be noted that polyethylene may contain chloride ion which would poison some catalysts and, therefore, the polyethylene before use must be treated to remove the chloride ion.

In the practice of this invention, the materials which are to comprise the electrode are mixed together and then placed in a press. The press prior to the application of the mixture of components which will comprise the electrode has placed upon the lower plate thereof a porous sheet which has little or no lateral expansion. The mixture which will form the electrode is placed upon the sheet. A second porous sheet is then placed upon the mixture and pressure is exerted on the assembly.

The following examples are for illustration purposes only and are not to be construed as a limitation upon the scope of the invention as set forth in the appended claims.

Example 1

In order to test the effectiveness of the procedure of this invention, a composition for pressing into an electrode was made by mixing finely divided polytetrafluoroethylene, ammonium oxalate and finely divided carbon powder in the ratio of 1:0.5:1. The carbon powder was impregnated with a platinum-iridium catalyst. The mixture was made into a paste and spread upon a 0.062 inch porous polytetrafluoroethylene sheet. After the mixture was spread upon the polytetrafluoroethylene sheet, a second 0.062 inch porous polytetrafluoroethylene sheet was placed thereupon. The mixture was pressed at a pressure of 10,000 p.s.i. The pressure was removed and the resulting pressed composition had smooth surfaces and was not ruptured. The procedure was repeated twice. In the first repeat 0.2 inch sheets of polytetrafluoroethylene were substituted for the 0.062 inch sheets. After pressing, the structure was badly pulled apart and lacked integrity. In the second repeat, two pieces of filter paper coupled with nonporous polypropylene sheet were substituted for the polytetrafluoroethylene sheets and after pressing, the material was badly forced apart.

Example 2

In order to further test the effectiveness of the procedure, two compositions were made and pressed. The compositions comprise 20 grams of finely divided carbon, 15 grams of finely divided polytetrafluoroethylene and 15 grams of ammonium oxalate. The material was mixed with a solvent to form a soft paste. The mixture was divided into two parts. The first part was spread upon a tantalum screen laying upon a thin porous polyethylene sheet which in turn was supported upon filter paper. A thin porous polyethylene sheet was placed upon the mixture and then a sheet of filter paper was placed upon the polyethylene sheet. The assembly was then subjected to a pressure of 5,000 p.s.i. The pressure was removed and the pressed structure was found to have smooth surfaces, be substantially dry and was in one piece, that is, there were no breaks or cracks in the pressed structure. The second half of the mixture was spread upon a tantalum screen supported on filter paper but separated from it by a nonporous polypropylene sheet, a second sheet of nonporous polypropylene and then a piece of filter paper was placed upon the mixture and pressure of 5,000 p.s.i. was exerted thereupon. The pressure was removed and the pressed structure was investigated and found to have even surfaces but with cracks in the body.

The foregoing results indicate that the improved process of this invention does, in fact, provide for greater economies in the manufacture of electrodes.

What is claimed is:

1. In a method of making catalytic electrodes by cold pressing a wet mixture of the components of the electrode in a press, the improvement comprising cold pressing the wet electrode mixture between two organic porous members each having a thickness less than 0.12 inch and substantially no lateral expansion when subjected to a pressure up to about 10,000 p.s.i., thereby producing a catalytic electrode which has a substantially smooth and crack-free surface.

2. A method as in claim 1 wherein the two members are sheets of porous polytetrafluoroethylene.

3. A method as in claim 1 wherein the two members each comprise filter paper having a thin sheet of porous polyethylene thereon.

4. In a method of making an electrode which comprises cold pressing a mixture of the components of the electrode in the form of a soft paste, the improvement comprising cold pressing the soft paste between the two porous polytetrafluoroethylene sheets each having a thickness less than 0.12 inch.

5. A method as defined by claim 1 wherein said organic porous members consist essentially of halogenated hydrocarbon polymer.

References Cited

UNITED STATES PATENTS

| 3,134,697 | 5/1964 | Niedrach | 136—86 |
| 3,259,677 | 7/1966 | Zwick | 264—127 X |

FOREIGN PATENTS

| 16,570/28 | 11/1929 | Australia. |
| 1,272,579 | 8/1961 | France. |

ROBERT F. WHITE, *Primary Examiner.*

J. A. FINLAYSON, *Assistant Examiner.*